United States Patent [19]
Waldron

[11] Patent Number: 5,778,687
[45] Date of Patent: Jul. 14, 1998

[54] TEMPERATURE CONTROL

[75] Inventor: Stephen N. Waldron, Lingfield, England

[73] Assignee: The BOC Group plc, Windlesham, England

[21] Appl. No.: 883,556

[22] Filed: Jun. 26, 1997

Related U.S. Application Data

[63] Continuation of Ser. No. 691,899, Aug. 1, 1996, abandoned.

[30] Foreign Application Priority Data

Aug. 1, 1995 [GB] United Kingdom ............... 9515782

[51] Int. Cl.$^6$ .................................................. F25B 9/00
[52] U.S. Cl. ........................................ 62/78; 62/388
[58] Field of Search ........................ 62/386, 388, 78; 454/902

[56] References Cited

U.S. PATENT DOCUMENTS

| | | | |
|---|---|---|---|
| 1,511,306 | 10/1924 | Slate | 62/388 |
| 1,939,551 | 12/1933 | Hassendon | 62/388 |
| 1,963,674 | 6/1934 | Pearsons | 62/388 |
| 3,069,869 | 12/1962 | Mueller | 62/386 |
| 3,163,022 | 12/1964 | Hottenroth | 62/388 |
| 3,758,029 | 9/1973 | Yoshida | 62/78 |
| 4,399,659 | 8/1983 | Nielsen | 62/388 |
| 4,716,739 | 1/1988 | Harris et al. | 62/78 |
| 4,726,195 | 2/1988 | Klee | 62/388 |

FOREIGN PATENT DOCUMENTS

| | | |
|---|---|---|
| 4117419 A1 | 5/1991 | Germany. |
| 482542 | 2/1937 | United Kingdom. |
| 2218197 | 5/1989 | United Kingdom. |
| 2227306 | 12/1989 | United Kingdom. |

*Primary Examiner*—William E. Tapolcai
*Attorney, Agent, or Firm*—R. Hain Swope; Salvatore P. Pace

[57] ABSTRACT

An apparatus for controlling the temperature in a building for human or animal occupancy comprises a source of liquid breathable, life-supporting gas consisting of oxygen and nitrogen, dispensing means for dispensing a vaporized mist of the gas within said building. The dispensed mist, being at significantly lower than ambient temperature, acts to cool the atmosphere within the building much more rapidly and effectively than conventional systems.

5 Claims, 2 Drawing Sheets

TEMPERATURE CONTROL

This is a continuation of Ser. No. 08/691,899 filed Aug. 1, 1996 by Stephen N. Waldron for TEMPERATURE CONTROL, now abandoned.

The present invention relates to temperature control and relates particularly, but not exclusively, to the control of temperature within buildings.

BACKGROUND OF THE INVENTION

In the intensive rearing of animals, control of the environment is fundamental to the welfare of the animal. Most species can survive comfortably, provided that the temperature range to which they are exposed does not vary widely. For example, chickens reared in hot climates produce less feathers than those reared in cool climates. If a bird reared in a cool climate is suddenly exposed to high temperatures, its metabolism is unable to cope and, unless some form of forced cooling is provided, the bird may die of heart failure.

In Northern European countries, the frequency of such rapid changes in climatic conditions is relatively low, i.e. five to ten days per year. However, if such a temperature change were sudden, for example an increase from 20° C. to 30° C. over one to two days, forced convection cooling would not be effective. In such conditions, it could be expected that large numbers of birds would die.

Similar problems exist in buildings used for human occupancy, such as for example hospitals, offices, shops and the like. The conventional cooling systems are often unable to provide sufficient cooling capacity to maintain a sufficiently low temperature within the building and hence any occupant will feel uncomfortable. This is particularly so when the outside air temperature is high and the conventional cooling system relies on circulation of outside air within the building.

In accordance with the present invention there is provided an apparatus for controlling the temperature in a building which reduces and possibly eliminates the problems associated with presently known cooling arrangements.

SUMMARY OF THE INVENTION

An apparatus for controlling the temperature in a building for human or animal occupancy is provided in accordance with the present invention which comprises: a storage vessel, for storing a quantity of liquefied, breathable, life supporting gas; dispensing means within said building for dispensing said gas and including vaporizing means for vaporizing the gas during dispensing such that the vaporized gas acts to chill the atmosphere within the building and thus reduce the temperature of any humans or animals situated therein.

BRIEF DESCRIPTION OF THE DRAWINGS

The following drawings are illustrative of embodiments of the invention and are not intended to limit the invention as encompassed by the claims forming part of the application.

DETAILED DESCRIPTION OF THE PREFERRED EMBODIMENTS

In the apparatus for controlling the temperature in a building for human or animal occupancy provided in accordance with the present invention, the liquefied breathable, life supporting gas, when fully vaporized is between about 19% and 23% oxygen with the remaining 77% to 81% being nitrogen. Advantageously, the apparatus further includes an additional source of oxygen or oxygen rich gas for increasing the oxygen level within the housing over and above that of normal atmospheric air or that dispensed from said dispensing means.

Advantageously, the dispensing means comprises a spray bar extending along an upper portion of the house and the vaporizing means comprises a plurality of spray nozzles positioned along the spray bar for causing vaporized gas to descend form said spray bar and toward any animals within said building and thus reduce the temperature of any humans or animals situated therein.

Preferably, the apparatus includes a temperature sensor and control means for sensing the temperature within the building and for causing operation of said apparatus at and above a predetermined temperature. Conveniently, the temperature sensor is positioned at human or animal height. In a particularly advantageous arrangement, the apparatus further includes water chilling means for chilling water to be consumed by animals in said building, thereby assisting in the temperature control of the animals. Conveniently, the water chilling means comprises a heat exchanger for causing heat exchange between the gas and the water.

The present invention also provides a method of controlling the temperature in a building comprising dispensing a quantity of liquefied, breathable, life supporting gas from a dispensing means via a vaporizing means thereby to provide a chilled vaporized gas within the building that acts to chill the atmosphere within the building.

Figure 1:
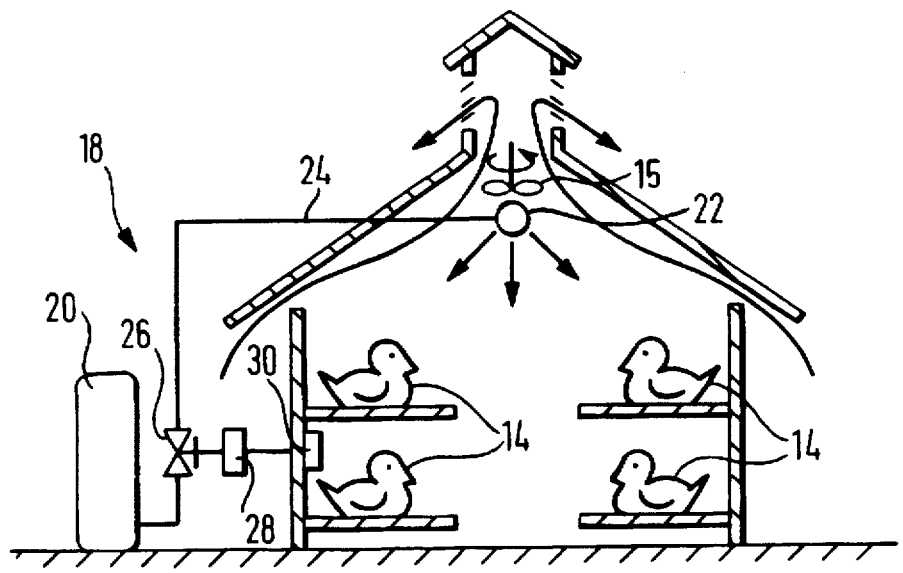
FIG. 1 is a cross-sectional view of an animal rearing house incorporating a temperature control apparatus in accordance with the present invention.

Turning now to the drawings in FIG. 1, an animal rearing house 10 is provided with an apparatus for controlling the temperature shown generally at 18. Animals, such as for example, chickens 14 are typically provided with perches 16 at various levels thus housing a large number of birds in a comparatively small space. Such close packing of animals results in the generation of a substantial amount of 'body heat' which acts to significantly increase the temperature within the house 10. An additional, and potentially more dangerous, heat increase will result from climatic variations which, if abrupt and not effectively countered, can result in the death of the animals.

Conventional forced air cooling apparatus (shown schematically by fan 15) operate by circulating outside air through the house 10, thereby cooling the animals situated therein. During very hot periods, the outside air maybe too warm to facilitate any significant degree of cooling effect. Hence, the body temperature of the animals can rise to unacceptably high levels and many might die. Experience has shown that, in order to avoid the build up of ammonia and the like, it is desirable to operate a conventional forced cooling apparatus for at least short periods of time rather than rely solely on the apparatus of the present invention. Additionally, there are critical periods in a chicken's development during which the thermal stress associated with high ambient temperatures might not be adequately alleviated by peak temperature lopping or periodic cooling regimes. During such periods, it might be beneficial to employ the apparatus of the present invention in a manner which provides constant temperature control rather than periodic temperature reduction, thus eliminating any thermal stress. Further to this, there will be periods in the chicken's development where cooling is not necessary and, hence, the apparatus of the present invention can be turned off.

Figure 2:
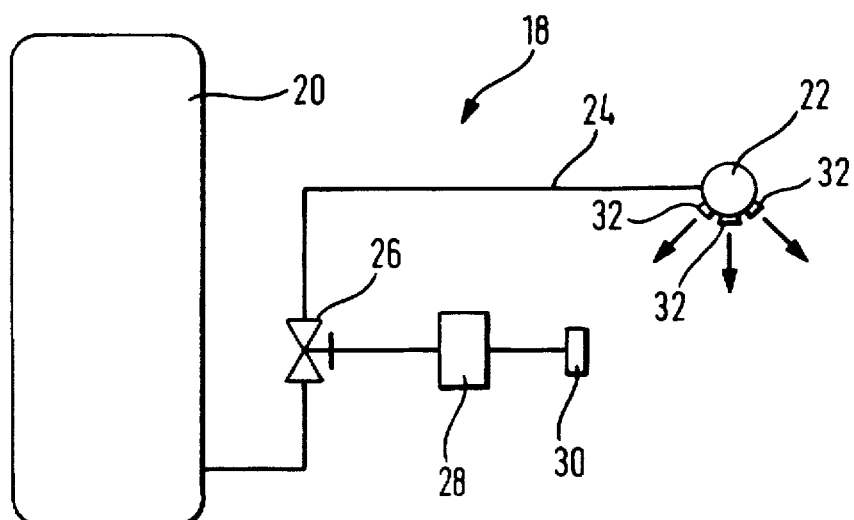
FIG. 2 is a diagrammatic representation of one arrangement of the present invention.

The present invention provides a cooling apparatus 18 for use in combination with conventional cooling apparatus which facilitates rapid and direct chilling of the interior of the building during abnormally high temperatures. The apparatus itself 18 comprises a vacuum insulated storage vessel 20 for storing liquefied breathable, life supporting gas and a dispensing means, shown generally at 22, for dispensing said gas within the building in a manner which allows the vaporized gas to chill the atmosphere within the building and thus reduce the temperature of any animals situated therein. The apparatus 18 can be seen in more detail in FIG. 2, from which it will be appreciated that a comparatively short length of supply pipe 24 is used to transport the gas from vessel 20 to dispensing means 22. A valve 26 in supply pipe 24 is connected for actuation to a controller 28 which is operable to initiate opening of valve 26 upon detection by sensor 30 of a temperature at or above a predetermined level. Preferably, the sensor 30 is positioned at animal height, thereby to facilitate detection of the temperature adjacent the animals. The dispensing means 22 may comprise one or more pipes extending the length of an upper portion of the building, as shown in FIG. 1 and may include a plurality of nozzles 32 for dispensing a fine mist of vaporized gas. For maximum benefit, nozzles 32 may be positioned for creating a wide spread of mist, as shown in FIGS. 1 and 2.

Figure 3:
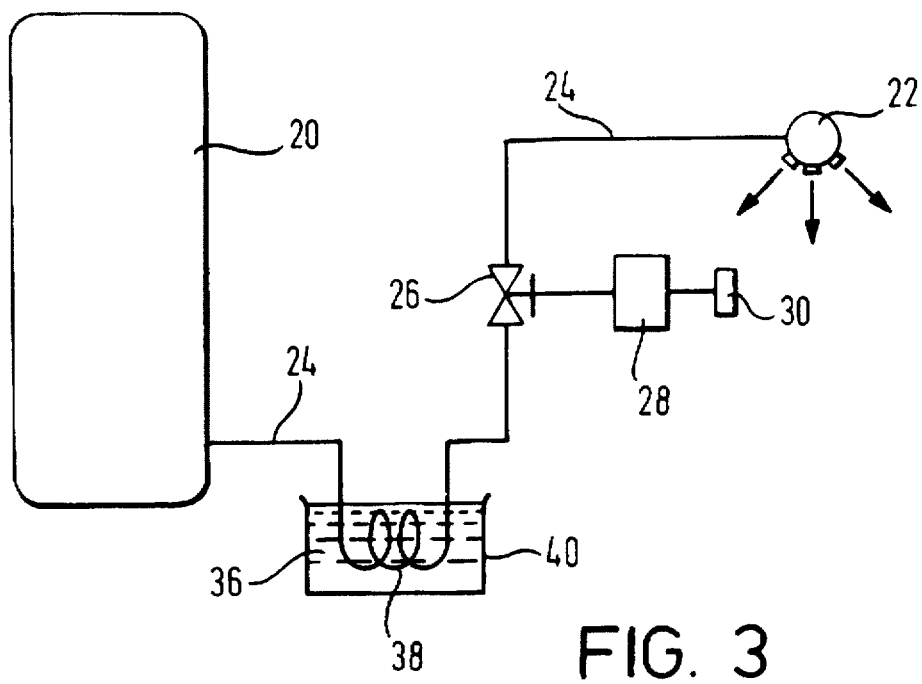
FIG. 3 illustrates the integration of a water chilling device with the present invention.

Referring now briefly to FIG. 3, it will be appreciated that, when one is using the apparatus to control the atmosphere within an animal housing, it might be advantageous to chill the drinking water 36 thereby to facilitate a further degree of animal cooling. Such an arrangement could include a simple heat exchanger in the form of a coil 38 of supply pipe 24 which is immersed in a drinking trough 40 having the water therein.

When a large number of animals are kept in a confined space they tend to generate a large quantity of $CO_2$, thus depleting the oxygen concentration. In hot weather, such oxygen depletion can be a serious problem as the animals respiration rate must increase and hence the animal's body temperature rises accordingly. To combat this problem, a liquid oxygen/nitrogen mixture could be provided which has an oxygen concentration slightly higher than that of normal air, an additional tank 42 of substantially pure oxygen might be provided for supplementing the gas supplied from vessel 20. Such an alternative arrangement is shown in FIG. 4 from which it will be seen that the controller 28 is advantageously connected to an oxygen monitor 44 situated within the building to be cooled and oxygen supply valve 46 acts in response to signals from controller 28 to allow or inhibit the flow of oxygen through supply pipe 48 and, hence, to supply pipe 24 in which it is mixed with the gas being dispensed from vessel 20.

Whilst the above-mentioned invention has been described with specific reference to animal welfare, it will be appreciated that such an apparatus 18 may be employed in buildings suitable for human occupancy such as, for example, hospitals, offices, shops and the like. In such buildings, the apparatus 18 may be used to provide a temporary or long-term boost to conventional ambient air circulation systems or air conditioning systems. In such an arrangement, it might be appropriate to delete the water chilling portion of the apparatus.

Operation of the present system is fairly simple and needs no specific manual input. Once operational, temperature sensor 30 detects the temperature within the building and sends a signal to controller 28 which monitors the temperature and initiates control over at least valve 26 to open said valve at or above a predetermined temperature. Liquid gas is supplied to nozzles 32 and dispensed as a fine chilling mist which descends throughout the building thereby cooling the atmosphere whilst maintaining a breathable atmosphere. The degree and speed of cooling available by using a mist of cryogenic gas is significant and hence it is possible to provide rapid reduction in building temperature. For example, it is estimated that the present apparatus is able to create within 20 minutes of operation the same degree of cooling achieved in 12 hours with a conventional mechanical system. Clearly, with such rapid control, it will be possible to operate the present system for comparatively short periods of time, thereby enabling one to rapidly cool a building just before it is to be occupied by humans or animals.

Figure 4:
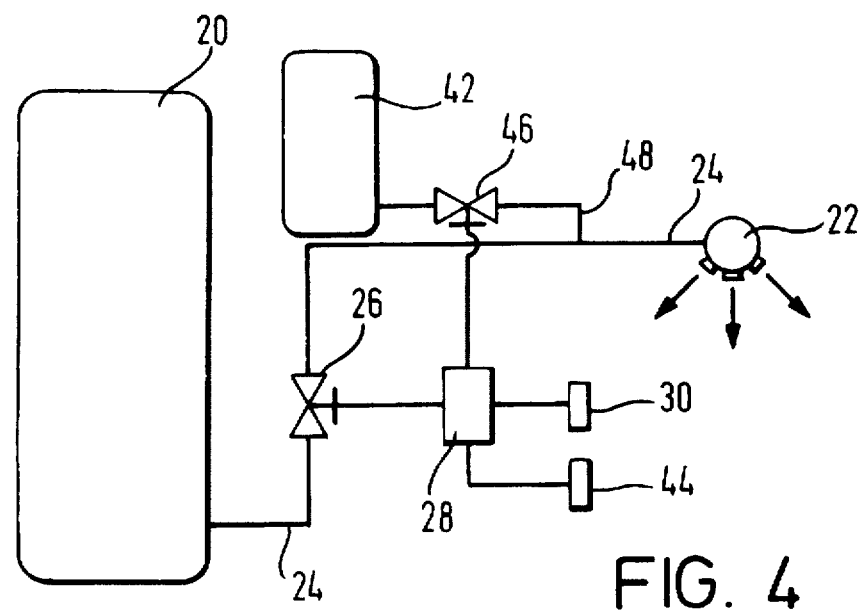
FIG. 4 illustrates the integration of a supplemental oxygen supply with the present invention.

Whenever it is desirable to ensure the oxygen level within the building remains above a predetermined level one simply increases the oxygen concentration of the liquid gas mixture or employs the arrangement illustrated in FIG. 4. Oxygen monitor 44 of FIG. 4 acts to monitor the oxygen concentration within the building and send a signal to controller 28 which initiates operation of valve 46 as and when desired.

In view of the fact that the present invention might only be operated a few days a year, it will be possible to employ a comparatively small, possibly portable, source of liquid gas. This source could be supplied on a rental basis and when required, thus significantly reducing the cost of permanently installed equipment.

A further advantage of the present invention resides in the fact that the incoming chilling atmosphere is virtually devoid of moisture (about 1 ppm water) and hence its introduction into a high humidity atmosphere will reduce significantly the average humidity within the building. Such humidity control is an important factor when one is attempting to provide comfortable working or living conditions.

Mixing of the liquid nitrogen and liquid oxygen is undertaken at the source of production such that a mixture of the desired mix is provided in one vessel for "on demand" supply to the customer. Whilst the actual ratio of the mixture required will very much depend upon the magnitude of any "enrichment" during storage and transfer, it has been found that such mixtures are surprisingly stable and, hence, little if any enrichment will take place. Indeed, enrichment will only take place when the liquid mixture boils and is therefore a function of storage tank heating. Any heating of the vessel will result in the more volatile nitrogen boiling off and vaporizing within any headspace in the vessel. Such vaporization will result in the remaining liquid becoming slightly enriched in the less volatile oxygen. Provided the vessel does not overpressurize and vent the vaporized atmosphere, the enrichment will be negligible. However, if in practice the liquid in the vessel does become excessively enriched, then the remaining gas should be vented off and the vessel refilled.

The percentage of oxygen present in the final vaporized form should be sufficient to provide a comfortable, breathable atmosphere which does not present a fire hazard. In practice, an oxygen concentration of between about 19% and 23% by volume in the fully vaporized state has been found to provide sufficient oxygen to support life whilst still being fire safe.

The person skilled in the art will be well aware of the mixing process required to produce a gas mixture which, when fully vaporized, provides an oxygen concentration within the above-mentioned range. However, we offer the following calculations by way of example.

| BASIC DATA | | |
|---|---|---|
| | At Boiling Point | At 0° C. |
| Density of Oxygen | 1140. kg/m$^3$ (at −183° C.) | 1.429 kg/m$^3$ |
| Density of Nitrogen | 808.1 kg/m$^3$ (at −196° C.) | 1.2505 kg/m$^3$ |

EXAMPLE 1

Atmosphere required=19% oxygen by volume at 0° C. once dispensed from nozzles (remainder=$N_2$).

Assuming 100 m$^3$ volume.

Mass of $O_2$ required=19×1.429=27.151 kg

Mass of $N_2$ required=81×1.2505=101.290 kg

Therefore percentage $O_2$ by weight=21.14%

Therefore the liquid will need this proportion of its mass as $O_2$. Hence, assuming a liquid load of 100 kg the 27.151 kg of $O_2$ equates to a liquid volume of 23.82 liters and the 101.290 kg of $N_2$ equates to a liquid volume of 125.34 liters.

EXAMPLE 2

Atmosphere required=21% oxygen by volume at 0° C.

Mass of $O_2$ required per 100 m$^3$=30.009 kg

Mass of $N_2$ required per 100 m$^3$=98.789 kg

Therefore percentage $O_2$ by weight=23.3%

Assuming a liquid load of 100 kg.

23.30 kg $O_2$=20.439 liters (at boiling point)

76.70 kg $N_2$=94.91 liters (at boiling point)

EXAMPLE 3

Atmosphere required=22% oxygen by volume at 0° C.

Mass of $O_2$ required per 100 m$^3$=31.438 kg

Mass of $N_2$ required per 100 m$^3$=97.539 kg

Therefore percentage $O_2$ by weight=24.37%

Assuming a liquid load of 100 kg.

24.37 kg $O_2$=21.38 liters (at boiling point)

75.63 kg $N_2$=93.59 liters (at boiling point)

EXAMPLE 4

Atmosphere required=23% oxygen by volume at 0° C.

Mass of $O_2$ required per 100 m$^3$=32.867 kg

Mass of $N_2$ required per 100 m$^3$=96.288 kg

Therefore percentage $O_2$ by weight=25.45%

Assuming a liquid load of 100 kg.

25.45 kg $O_2$=29.013 liters (at boiling point)

74.55 kg $N_2$=60.244 liters (at boiling point)

I claim:

1. An apparatus for controlling the temperature while maintaining a breathable atmosphere in a building for human or animal occupancy comprising: a storage vessel including a quantity of liquefied breathable, life supporting gas such that, when fully vaporized, it consists of from about 19% to 23% by volume of oxygen and from about 77% to 81% by volume of nitrogen; dispensing means within an upper portion of said building for dispensing said gas and including vaporizing means for vaporizing the gas during dispensing such that the vaporized gas acts to chill the atmosphere within the building; temperature sensing and control means for sensing the temperature within said building and actuating said dispensing means at or above a predetermined temperature; an additional source of liquefied oxygen or oxygen-rich gas for increasing the oxygen level of said gas; and oxygen sensing means for sensing the oxygen concentration in said building and actuating the flow of said liquefied gas from said additional source when the oxygen concentration falls below a predetermined level.

2. An apparatus in accordance with claim 1, wherein said dispensing means comprises a spray bar extending along an upper portion of the building and the vaporizing means comprises a plurality of spray nozzles positioned along the spray bar for causing vaporized gas to descend form said spray bar.

3. An apparatus in accordance with claim 1, wherein said temperature sensing and control means is positioned at human or animal height.

4. An apparatus in accordance with claim 1, wherein said building is for animal occupancy, said apparatus further including water chilling means for chilling water to be consumed by animals in said building, said water chilling means comprising a heat exchanger for causing heat exchange between said life supporting gas and the water.

5. A method of controlling the temperature in a building while maintaining a breathable atmosphere therein comprising: providing a quantity of liquefied, breathable, life supporting gas such that, when fully vaporized, it consists of from about 19% to 23% by volume of oxygen and from about 77% to 81% by volume of nitrogen; sensing the temperature within said building and dispensing said gas via vaporizing means at or above a predetermined temperature thereby providing a chilled vaporized gas within an upper portion of the building that acts to chill the atmosphere therein; further providing an additional source of liquefied oxygen or oxygen-rich gas for increasing the oxygen level of said gas and oxygen sensing means for sensing the oxygen concentration in said building; and actuating the flow of said liquefied gas into said life supporting gas from said additional source when said oxygen concentration falls below a predetermined level.

* * * * *